United States Patent
Jüstel et al.

(10) Patent No.: US 6,509,685 B1
(45) Date of Patent: Jan. 21, 2003

(54) PLASMA DISPLAY SCREEN COMPRISING A RED PHOSPHOR

(75) Inventors: Thomas Jüstel, Aachen (DE); Hans Nikol, Aachen (DE); Helmut Bechtel, Roetgen (DE); Cornelis Reinder Ronda, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 120 days.

(21) Appl. No.: 09/698,760

(22) Filed: Oct. 27, 2000

(30) Foreign Application Priority Data

Oct. 29, 1999 (DE) .......................................... 199 52 242

(51) Int. Cl.⁷ ................................................ H01J 61/44
(52) U.S. Cl. ........................ 313/486; 313/467; 313/468
(58) Field of Search ................... 252/301.4 R; 313/486, 313/487, 467, 468, 581, 582

(56) References Cited

U.S. PATENT DOCUMENTS

| | | | | |
|---|---|---|---|---|
| 4,512,912 A | * | 4/1985 | Matsuda et al. | ...... 252/301.4 R |
| 4,946,621 A | * | 8/1990 | Fouassier et al. | ..... 252/301.4 R |
| 5,386,176 A | * | 1/1995 | Sumimoto et al. | .......... 313/468 |
| 5,742,122 A | * | 4/1998 | Amemiya et al. | .......... 313/582 |
| 5,994,831 A | * | 11/1999 | Van der Voort et al. | .... 313/486 |

FOREIGN PATENT DOCUMENTS

JP          57051783      *  3/1982  .......... 252/301.4 R

* cited by examiner

*Primary Examiner*—Ashok Patel

(57) ABSTRACT

A plasma display screen including a carrier plate, a transparent front plate, a ribbed structure which divides the space between the carrier plate and the front plate into plasma cells, which are filled with a gas, and including one or more electrode arrays for generating corona discharges in the plasma cells, and including a phosphor layer which includes a phosphor for generating red radiation selected from the group formed by rare earth metal borates of the general formula EA $M^1_{1-x-y}M^2_xEu_yB_9O_{16}$, where EA=Ca, Sr, Ba; $M^1$=Gd, La; $M^2$=Y, Lu, Sc, In and $0<x\leq0.5$, $0.01\leq y\leq0.4$, and $M^3_{1-r-s}Y_rEu_sBO_3$, where $M^3$=Sc,, In, Lu and $0.01\leq r\leq0.99$, $0.01\leq s\leq0.15$, is characterized by a red point which has shifted in the direction of a higher color saturation. In addition, the color contrast at brighter ambient lighting conditions is increased.

2 Claims, 1 Drawing Sheet

PLASMA DISPLAY SCREEN COMPRISING A RED PHOSPHOR

Figure 1:
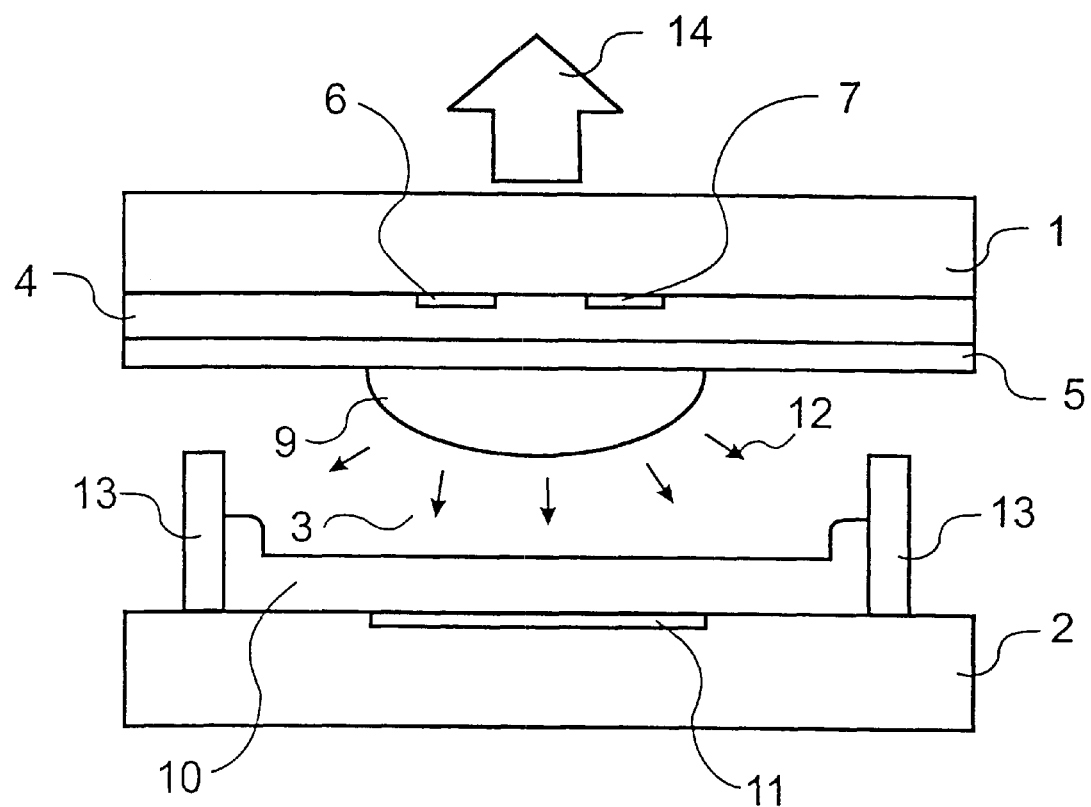

The invention relates to a plasma display screen comprising a carrier plate, a transparent front plate, a ribbed structure which divides the space between the carrier plate and the front plate into plasma cells, which are filled with a gas, and comprising one or more electrode arrays to generate corona discharges in the plasma cells, and comprising a phosphor layer.

The basic principle of a plasma display screen consists in that crossed electrode strips form a matrix, and a gas discharge taking place between them causes pixels to light up. The monochrome versions of the first plasma display screens used the generated light directly. However, as a result of the orange-red color caused by the neon-gas filling, these display screens never became popular and were used only in a very specific market, where there immunity against high magnetic interference fields, mechanical vibrations and extreme temperatures is important, such as in military applications, medical applications, such as NMR diagnostics, and in industrial applications, such as aluminium electrolyses and power stations.

Currently, the color versions of the plasma display screens are much more successful than the old monochrome plasma display screens. In the color versions, the gas filling is an inert gas, for example xenon, or an inert gas mixture, for example a mixture of helium, neon and xenon. In the discharge, ultraviolet radiation is formed in the VUV range i.e. the radiation has a wavelength below 200 nm. This UV radiation excites the phosphors in the phosphor layer arranged in stripes, causing visible light to be emitted in red, green and blue. Consequently, unlike conventional phosphor lamps, the luminescent materials in plasma displays use the high-energy side of the UV spectrum. Dependent upon the composition of the inert gas mixture and the gas pressure, the VUV emission can vary between a single line at 147 nm and a wide band near 172 nm. This leads to new requirements to be met by RGB phosphors in a plasma display. The RGB phosphors form the last member of the energy transfer chain in which electric energy is converted into visible light in the plasma display screen. The efficiency of a plasma display screen comprising a phosphor layer is decisively determined by how completely the generated UV light is absorbed in the phosphor and how completely the generated visible light subsequently leaves the plasma display screen in the direction of the observer.

It has been found that the electro-optical efficiency of conventional red phosphors, for example $Y_2O_3$:Eu or $Y_2O_2S$:Eu, is unsatisfactory in a plasma display screen because these red phosphors only slightly absorb radiation having a wavelength below 200 nm.

U.S. Pat. No. 4,085,350 discloses a light-emitting component comprising a europium-activated yttrium-gadolinium-borate of the general formula $\{[(Y_{1-x}Gd_x)_{1-z}B_z]_{1-y}Eu_y\}_2O_3$, where $0 \leq x \leq 1$, $0.001 \leq y \leq 0.1$, $0.25 \leq z \leq 0.75$, as the phosphor, which is excited by the VUV radiation of a gas discharge. This phosphor has an improved quantum yield for the VUV radiation having a wavelength X in the range between 10 and 200 nm.

However, a drawback of these phosphors for generating red radiation resides in that their color point does not lie within the EBU zone for red phosphors, but instead has shifted towards the orange range.

Therefore, it is an object of the invention to provide a plasma display screen comprising a carrier plate, a transparent front plate, a ribbed structure, which divides the space between the carrier plate and the front plate into plasma cells, which are filled with a gas, and comprising one or more electrode arrays for generating corona discharges in the plasma cells, and comprising a phosphor layer, which plasma display screen is characterized by an improved, faithful color rendition and a greater brightness.

In accordance with the invention, this object is achieved by a plasma display screen comprising a carrier plate, a transparent front plate, a ribbed structure which divides the space between the carrier plate and the front plate into plasma cells, which are filled with a gas, and comprising one or more electrode arrays for generating corona discharges in the plasma cells, and comprising a phosphor layer which includes a phosphor selected from the group formed by the rare earth metal borates of the general formula EA $M^1_{1-x-y}M^2_xEu_yB_9O_{16}$, where EA=Ca, Sr, Ba; $M^1$=Gd, La; $M^2$=Y, Lu, Sc, In and $0 \leq x \leq 0.5$, $0.01 \leq y \leq 0.4$, and $M^3_{1-r-s}Y_rEu_sBO_3$, where $M^3$=Sc,, In, Lu and $0.01 \leq r \leq 0.99$, $0.01 \leq s \leq 0.15$.

In such a plasma display screen, the red pixel has been shifted to obtain a higher color saturation. This does not only affect the red tones but also all intermediate tones on the lines red-green and blue-red, which can be achieved as a result of the increase of the color rendering triangle in the red range. Apart from the red and yellow tones, mainly the magenta range is affected. As a result, many color tones can be reproduced more faithfully, resulting in a visible difference. Besides, the color contrast at bright ambient lighting is improved.

Within the scope of the invention, it is preferred that the phosphor used is the rare earth metal borate $BaGd_{0.8}Eu_{0.2}B_9O_{16}$.

It may alternatively be preferred that the phosphor used is the rare earth metal borate $Lu_{0.5}Y_{0.425}Eu_{0.075}BO_3$.

The invention also relates to a phosphor selected from the group of the rare earth metal borates of the general formula EA $M^1_{1-x-y}M^2_xEu_yB_9O_{16}$, where EA=Ca, Sr, Ba; $M^1$=Gd, La; $M^2$=Y, Lu, Sc, In and $0 \leq x \leq 0.5$, $0.01 \leq y \leq 0.4$, and $M^3_{1-r-s}Y_rEu_sBO_3$, where $M^3$=Sc, In, Lu and $0.01 \leq r \leq 0.99$, $0.01 \leq s \leq 0.15$.

These and other aspects of the invention will be apparent from and elucidated with reference to two embodiments described hereinafter.

In the drawing:

FIG. 1 is a diagrammatic, cross-sectional view of a plasma display screen.

Light excitation caused by the UV radiation of a gas discharge is the basic principle of all types of plasma displays. Plasma displays can be divided into DC addressed display screens and AC addressed display screens. The difference between them relates to the way in which current limitation takes place.

FIG. 1 shows an example of a plasma cell of an AC plasma display. Such an AC plasma display screen is composed of a transparent front plate 1 and a carrier plate 2, which are kept at a distance from each other and are hermetically closed at the periphery. The space between the two plates forms the discharge space 3, which is bounded by the protective layer and the phosphor layer. Customarily, both the front plate and the carrier plate are made of glass. Individually drivable plasma cells are formed by a ribbed structure 13 of separating ribs. A plurality of transparent picture electrodes 6, 7 are arranged as strips on the front plate. The associated control electrodes 11 are provided on the carrier plate at right angles to said picture electrodes, thus enabling a discharge to be ignited at every crossing point. The discharge space is filled with a suitable discharge gas, for example xenon, a xenon-containing gas, neon or a neon-containing gas. The gas discharge is ignited between the picture electrodes 6, 7 on the front plate. To preclude direct contact between the plasma and the picture electrodes, the latter are covered with a dielectric layer 4 and a protective layer 5. In the discharge zone, the gas is ionized and a plasma 9 is formed, which emits UV radiation 12. The spectral intensity of the gas discharge changes in dependence upon the composition of the gas in the plasma cell. Gas mixtures containing less than 30 vol. % xenon emit substantially resonance radiation at 147 nm, gas mixtures containing more than 30 vol. % xenon, emit excimer radiation at 172 nm. The emitted UV radiation excites pixel-structured red, green and blue phosphors so as to make them emit light in the visible range 14, resulting in a perceived color. The pixels of the plasma display screen in the three primary colors red, blue and green are formed by a phosphor layer 10 on at least a part of the carrier plate and/or the walls of the separating ribs in the plasma cells. The plasma cells are each successively coated with a red, green or blue phosphor. Three adjacent plasma cells form a pixel, which enables all colors to be reproduced by mixing the three primary colors.

The phosphors used to generate the red color radiation of the general formula $M^3_{1-r-s}Y_rEu_sBO_3$, where $M^3$=Sc, In, Lu and $0.01 \leq r \leq 0.99$, $0.01 \leq s \leq 0.1$, are composed, just like the conventional phosphor $(Y,Gd)BO_3:Eu$, of a host lattice of vaterite structure, which host lattice is slightly doped with the activator ion $Eu^{3+}$. The vaterite structure includes two crystallographically independent lattice sites which are occupied by the trivalent cations. One of the two lattice sites has an inversion center. The $Eu^{3+}$ ion occupies both lattice sites.

The activator ion $Eu^{3+}$ has energy levels which can be occupied by direct excitation or indirectly by energy transfer, said energy levels being responsible for the luminescence. The energy levels, which participate in the emission process, exhibit only little interaction with the host lattice. The optical transitions only take place between the 4f levels, which are properly shielded from their co-ordination partner and their chemical environment by the outer electrons. As a result, they exhibit a typical line spectrum. The fact that their luminescence process is independent, in a first approximation, from their chemical environment makes the europium-containing phosphors unique. The $Eu^{3+}$-activated phosphors absorb UV photons by means of a charge-transfer condition. In a second step, the energy is transferred to the f-levels, which are deactivated and show typical ff-f-emission line spectra. In compounds having a vaterite structure, the activator ion $Eu^{3+}$ has an emission spectrum with three emission lines at 595 nm ($^5D_o$–$^7F_1$), 612 nm ($^5D_o$–$^7F_2$) and 628 nm ($^5D_o$–$^7F_2$). Surprisingly, it has been found that in the phosphors of the general formula $M^3_{1-r-s}Y_rEu_sBO_3$, where $M^3$=Sc, In, Lu and $0.01 \leq r \leq 0.99$, $0.01 \leq s \leq 0.1$, in which a part of the gadolinium has been replaced with Sc, In and Lu in comparison with $(Y,Gd)BO_3:Eu$, the intensity of the orange line at 595 nm with respect to that of the red lines at 612 nm and 628 nm has been reduced substantially, without a reduction of the quantum efficiency.

It has also surprisingly been found that in phosphors of the general formula $EAM^1_{1-x-y}M^2_xEu_yB_9O_{16}$ where EA=Ca, Sr, Ba; $M^1$=Gd, La; $M^2$=Y, Lu, Sc, In and $0 \leq x \leq 0.5$, $0.01 \leq y \leq 0.4$, wherein the activator ion $Eu^{3+}$ only occupies lattice sites having $C_{2v}$-symmetry, both the line at 595 nm and the line at 628 nm are reduced in intensity. On the other hand, the red line at 615 nm is very intensive and exhibits a high lumen equivalent of approximately 270 lm/W.

The rare earth metal borates are manufactured in accordance with conventional methods, for example by means of a solid-state reaction. In these methods, the oxides or carbonates are used as the starting compound. They are mixed, ground and subsequently sintered. In this manner, phosphors having a uniform crystal structure are obtained as fine-grain particles having a grain size in the range from 1 to 10 Jim.

To manufacture the phosphor layer use can be made of dry coating methods, for example electrostatic deposition or electrostatically assisted dusting, as well as wet coating methods, for example screen printing, dispensation methods, wherein a suspension is introduced using a nozzle moving along the channels, or sedimentation from the liquid phase.

For the wet coating methods, the phosphors must be dispersed in water, an organic solvent, if necessary in combination with a dispersing agent, a surface-active agent and a defoaming agent or a binder preparation. Organic and inorganic binders capable of withstanding an operating temperature of 250° C. without decomposing, embrittling or discoloring can suitably be used as the binder preparations for plasma display screens.

Although the invention has been described with reference to an AC color plasma display screen, the application of the invention is not limited to this type of plasma display screen but also includes, for example, DC color plasma display screens and monochromatic AC and DC plasma display screens.

EXAMPLE 1

To manufacture Ba $Gd_{0.8}Eu_{0.2}B_9O_{16}$, a quantity of 20.0 g (101.4 mmol) $BaCO_3$, 14.7 g (40.5 mmol) $Gd_2O_3$, 3.6 g (10.1 mmol) $Eu_2O_3$ and 57.1 g (92.3 mmol) $H_3BO_3$ are thoroughly ground in an agate mortar. After a first tempering operation at 700° C., the powder is ground again and sintered twice at 950° C. After the first sintering operation, the powder is ground again. Subsequently, the phosphor is washed with a diluted sodium hydroxide solution, filtered off and dried at 80° C. A white powder is obtained, which is passed through a sieve having a mesh size of 30 μm. By means of the phosphor thus prepared, a plasma display screen was manufactured in accordance with known methods and tested. The measured values obtained are listed in Table 1.

TABLE 1

| Color location x,y | $\lambda_{max}$ [nm] | LE [1 m/w] | $QE_{254}[\%]$ | $RQ_{615}[\%]$ |
|---|---|---|---|---|
| 0.644, 0.341 | 615 | 270 | 65 | 99 |

EXAMPLE 2

To manufacture $Lu_{0.5}Y_{0.425}Eu_{0.075}B_{0.3}$, a quantity of 28.6 g (71.8 mmol) $Lu_2O_3$, 13,78 g (61.0 mmol) $Y_2O_3$, 37.9 g (10.8 mmol) $Eu_2O_3$ and 21.3 (344,6 mmol) $H_3BO_3$ are thoroughly ground in an agate mortar. After a first tempering operation at 600° C. in a corundum boat, the powder is ground again and sintered twice at 1250° C. After the first sintering operation, the powder is ground again. Subsequently, the phosphor is washed using diluted hydrochloric acid, filtered off and dried at 80° C. A white powder is obtained which is passed through a sieve having a mesh size of 30 μm. The phosphor thus prepared is used to manufacture a plasma display screen by means of known methods, which is subsequently tested. The measured values are listed in Table 2.

TABLE 2

| Color location x,y | $\lambda_{max}$ [nm] | LE [1 m/W] | $QE_{254}[\%]$ | $RQ_{615}[\%]$ |
|---|---|---|---|---|
| 0.640, 0.350 | 595 | 265 | 55 | 99 |

What is claimed is:

1. A plasma display screen comprising a carrier plate, a transparent front plate, a ribbed Structure which divides the space between the carrier plate and the front plate into plasma cells, which are filled with a gas, and comprising one or more electrode arrays for generating corona discharges in the plasma cells, and comprising a phosphor layer which includes a phosphor of the general formula $M^{1-r-s}Y_rEu_sBO_3$, where $M^3$ is at least one of Sc, In and Lu and $0.01 \leq r \leq 0.99$, $0.01 \leq s \leq 0.15$.

2. A plasma display screen as claimed in claim 1, characterized in that the phosphor used is the rare earth metal borate $Lu_{0.5}Y_{0.425}Eu_{0.075}BO_3$.

* * * * *